United States Patent [19]

Settlemyer et al.

[11] 4,059,017

[45] Nov. 22, 1977

[54] DETECTING APPARATUS WITH EXCESS PRESSURE PROTECTORS

[75] Inventors: Bernard W. Settlemyer, Longmont; Clifford W. Knappenberger, Broomfield; Alfred Bader, Boulder, all of Colo.

[73] Assignee: General Cable Corporation, Greenwich, Conn.

[21] Appl. No.: 702,061

[22] Filed: July 2, 1976

[51] Int. Cl.² .............................................. F16K 17/02
[52] U.S. Cl. ....................................... 73/395; 137/540
[58] Field of Search ................ 73/389, 395, 416, 420, 73/119 A; 137/535, 540–541

[56] References Cited

U.S. PATENT DOCUMENTS

| | | | |
|---|---|---|---|
| 2,821,991 | 2/1958 | Marx | 137/541 X |
| 3,177,707 | 4/1965 | Whyte | 73/119 A |
| 3,207,179 | 9/1965 | Klagues | 137/540 X |
| 3,267,959 | 8/1966 | Savage | 137/541 X |
| 3,756,273 | 9/1973 | Hengesbach | 137/540 |

Primary Examiner—Richard C. Queisser
Assistant Examiner—Charles Gorenstein
Attorney, Agent, or Firm—Roy C. Hopgood; John M. Calimafde; Charles W. Neill

[57] ABSTRACT

This invention makes possible the use of a very small pressure relief valve for protecting pressure gauges, thermometers, humidity indicators and other detectors from excessive pressure in an element in which the fluid is contained and of which the indicators must measure a characteristic. The pressure relief valve is located in an exhaust branch outlet from passages that connect the detector with the element in which the fluid is contained; and the relief valve has a housing with an inlet port of a cross-section much less than the cross-section of the passage from the element containing the fluid. This inlet port throttles the flow of fluid into the relief valve. By thus reducing the cross section of the inlet port, the relief valve can be as small and inexpensive as desired, commensurate with the flow required by the detector where the detector is of a nature requiring a flow of the fluid.

13 Claims, 1 Drawing Figure

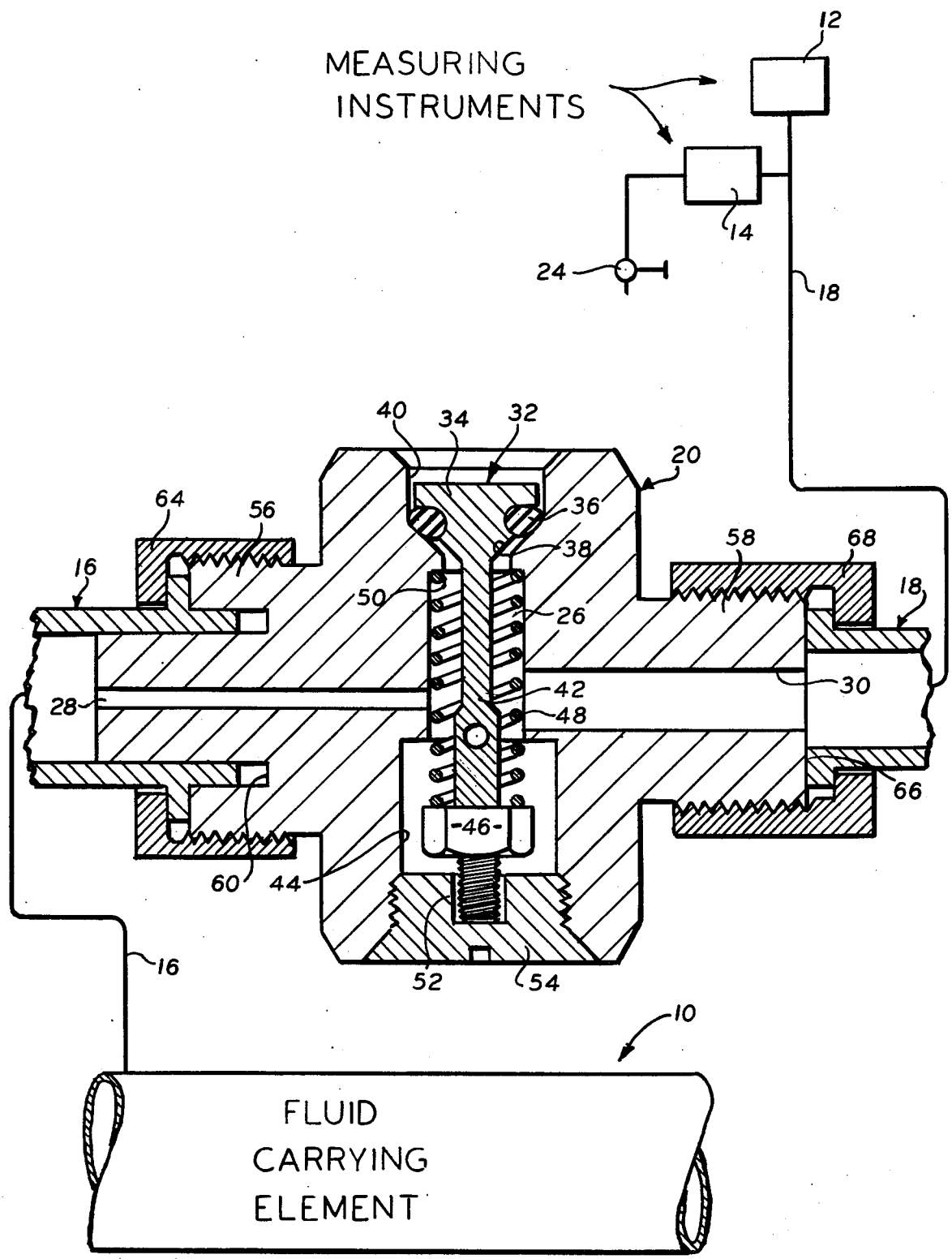

DETECTING APPARATUS WITH EXCESS PRESSURE PROTECTORS

BACKGROUND AND SUMMARY OF THE INVENTION

The purpose of this invention is to establish overpressure protection for devices used to measure various quantities and qualities of fluid systems. Some of these quantities and qualities are pressure, temperature, humidity, flow, etc. This device allows for overpressure protection without the necessity for relieving the total quantity of fluid which can be delivered through the fluid carrying elements (i.e., pipeline) leading to the sensing device. This is desirable, since if protection is established by relieving the elements' full fluid carrying capacity, the relieving device becomes large and expensive. The invention is intended for protecting cable pressurization monitoring devices such as pressure transducers, flow transducers, pressure contactors, etc. These devices are normally subjected to pressures below 15 psig but occasionally may be subjected to higher pressure during component testing. The invention can be used for other purposes.

The protection device consists of an inlet flow controlling port followed by a pressure relieving poppet, and lastly a larger delivery port which connects to the sensing device.

The inlet flow control port is sized significantly smaller than the poppet relieving port. The sizing is determined by the pressure, $P_1$, the delivery duct might carry to the sensing device and the pressure, $P_2$, the sensing device is cable of withstanding. The size relationship is such that the inlet port is restrictive enough to limit flow with pressure differential $P_1 - P_2$ to the flow the poppet relieving port can carry with pressure differential $P_2$ — atmospheric pressure or the normal discharge pressure of the environment at the exhaust of the relieving port.

In the case of protecting a cable pressure transducer (operating range of 0 – 10 psig and maximum pressure capability of 30 psig), an overpressure supply could be as high as 100 psig. This pressure could be carried through an inlet duct of ⅜ inch tubing. To protect the transducer from 30 psig overpressure would normally require a relieving device with a port size of ¾ inch diameter. The selection of a proper ratio of inlet port diameter to poppet port effective diameter will allow for a maximum of 30 psig delivery through the delivery port. The actual size of the inlet port will be determined by the requirements of the sensing device. For example, if the sensing device requires large volumes of fluid, a very small inlet port will result in response time lags of the sensed quantity or quality. System requirements will dictate the necessary considerations as to response.

Other objects, features and advantages of the invention will appear or be pointed out as the description proceeds.

BRIEF DESCRIPTION OF DRAWING

The drawing is a diagrammatic illustration of the preferred embodiment of the invention.

DESCRIPTION OF PREFERRED EMBODIMENT

A fluid-carrying element 10, which may be a pressurized cable, contains the fluid under substantial pressure which may be 10 psig during normal operation and which may be as high as 100 psig at times of over-pressure supply. Characteristics of this fluid pressure can be measured by measuring instruments comprising an instrument 12, and another instrument 14 connected with the element 10 through passages 16 and 18 and through intermediate housing 20 located at an intermediate region along the length of the passages 16 and 18.

The instrument 12 represents a detector of the nature which does not require that any fluid pass through it; for example, a pressure gauge. The instrument 14 is a dectector which requires that there be a flow of fluid passing through the detector; for example, a moisture detector. The rate of flow of fluid through the detector 10 is regulated by a valve 24 or other regulator for changing the rate of flow. Both of the detectors 12 and 14 are connected with the passage 18, which leads from the outlet side of the housing 20.

Within the housing 20, there is a chamber 26. Fluid flows from the passage 16 into the chamber 26 through an inlet port 28; and fluid flows from the chamber 26 to the passage 18 through an outlet port 30.

At the upper end of the chamber 26, there is a pressure relief valve 32 which includes a valve head 34 with packing 36 that contacts with a seat 38 when the relief valve is in closed position.

Above the valve seat 38, there is a port or bore 40 of larger diameter than the valve head 34, so that fluid can escape from the chamber 26 around the sides of the valve head 34 when the relief valve is in open position. The housing 20 is open at the upper end of the bore 40 for the escape of fluid into the ambient atmosphere.

The relief valve has a stem 42 extending downward through the chamber 26 and through an enlarged portion 44 of the chamber 26. In this enlarged portion 44, there is a nut 46 threaded on the lower end of the stem 42. This nut 46 provides a shoulder on the stem 42 for holding a spring 48 compressed against a fixed shoulder 50 located below the valve seat 34. If the shoulder is fixed on the valve stem, the pressure of the spring is constant; but by having the shoulder a threaded nut 46, the tension of the spring 48 can be adjusted as desired to change the pressure at which the relief valve will open.

The lower end of the stem 42 extends into a socket 52 in the upper end of a plug 54, which threads into an enlarged and threaded lower end of the chamber 26.

It is a feature of the invention that the inlet port 28 has a cross-section which is much less than the cross-section of the passage 16. This greatly limits the rate of flow of fluid from the passage 16 into the chamber 26. The outlet port 30 has a diameter substantially larger than the inlet port 28. There is no advantage in having the outlet port 30 restricted, and there is a disadvantage in that any unnecessary restriction beyond the chamber 26 causes delay in response of detector equipment to which fluid is supplied through the outlet port 30 and the passage 18. The restriction in the inlet port 28, on the upstream side of the chamber 26, is a necessary restriction for obtaining the advantages of this invention.

If an ordinary pressure relief valve were interposed between the passage 16 and 18, a very large and expensive relief valve would be necessary in order to carry away the fluid fast enough to prevent build-up of pressure in the passage 18 leading to the detectors which must be protected from excessive pressure. By having the housing 20 with the greatly restricted inlet port 28, this invention permits the use of a small housing and inexpensive relief valve, while at the same time providing full protection for the detectors against excessive over-pressure in the pressurized cable or other element in which pressure is contained. The greater the restriction, the smaller the relief valve can be. However, in systems where some of the detectors require a flow of fluid through them, the rate of fluid flow determines the size which must be used for the inlet port 28. In addition to the size relationships already pointed out in the introduction of this specification, the relationship must provide for the necessary total flow, and the inlet port will control the associated sizes of other ports so as to satisfy the relationships:

when $P_1$ = The maximum pressure possible in the element 10 that contains the process fluid.

when $P_2$ = The maximum pressure the chamber 26 can attain without resultant damage to instruments 12 and 14.

when $P_a$ = The maximum pressure existing in the environment at the discharge of relief valve 32.

when $F_{28}$ = The capacity for fluid flow through port 28 at existing pressures $P_1$ and $P_2$.

when $F_{32}$ = The capacity for fluid flow through relief valve 32 at pressures $P_2$ and $P_a$.

then To protect instruments 12 and 14 $F_{32} \geqq F_{28}$.

Experience has shown that for the type of service for which this invention is intended, the ratio of the cross-section of the inlet port 28 to the equivalent cross-section of the relief valve 32 should be cross section $28=1$, cross-section $32 \geqq 9$.

Outlet port 30 and passage 18 should be sized to allow for good operation of instruments 12 and 14. In general, it will suffice to allow passage 18 to be large enough to handle any flow from fluid carrying element 10 to instruments 14 and 12, or vice versa (via breathing due to temperature or pressure change), without creating time lags that would prevent proper monitoring.

The housing 20 has connector portions 56 and 58 for securing it to the passages 16 and 18, respectively. It is important that the housing be connected with the passages 16 and 18 in such a way that the restricted passage 28 is at the upstream side of the housing 20. In order to prevent the housing 20 from being connected in the line backwards, the connections between the housing and the passages 16 and 18 may be different in construction, so that it is impossible to connect the housing in the line backwards. These incompatible connections can take various forms or arrows embossed on the device may be used to show the intended direction of flow.

In the construction illustrated in the drawing, the passage 16 extends into an annular socket 60 in the end face of the housing 20, and a flange 62 abuts against the housing and is clamped to the housing by a nut 64.

At the other end of the housing 20, a flange 66 on the passage 18 is clamped against an end face of the connector 58 by a nut 68, which screws over threads on the connector 58. These constructions for connecting the passages 16 and 18 with the housing 20 are merely representative of different structures for insuring the connection of the housing 20 with the inlet passage 28 at the upstream side of the housing.

The preferred embodiment of the invention has been illustrated and described, but changes and modifications can be made, and some features can be used in different combinations without departing from the invention as defined in the claims.

What is claimed is:

1. Apparatus for detecting characteristics of a fluid, including in combination, an element in which the fluid is contained under pressure, a detector for sensing a particular characteristic of the fluid, a passage leading from said element and another passage leading to said detector, means for protecting the detector from excess pressure in said element in which the fluid is contained, said means comprising a pressure relief valve including a housing enclosing a chamber, inlet and outlet ports of said chamber connecting with the passages leading from the element and to the detector, respectively, a third port for exhaust of fluid from the chamber, the pressure relief valve controlling flow of fluid from said third port, the inlet port being of substantially smaller diameter than the outlet port for throttling the flow of fluid into the chamber of the relief valve to limit the maximum rate of flow that can reach the relief valve so that said maximum rate of flow can be discharged from the apparatus by a relief valve of smaller size, less weight and lower cost, while the larger outlet port limits any flow throttling upstream of the relief valve, and the third port of the relief valve being of a cross-section sufficient to exhaust fluid from the chamber at a rate equal to the throttled flow through the inlet port.

2. The apparatus described in claim 1 characterized by the parts being so proportioned as to satisfy the relationships $F_{32} \geqq F_{28}$:

where [$P_1$ =] The maximum pressure possible in the element 10 that contains the process fluid;

where [$P_2$ =] The maximum pressure the chamber 26 can attain without damage to the detector 12 and 14;

where [$P_a$ =] The maximum pressure existing in the environment at the discharge of the relief valve 32;

where [$F_{28}$ =] The capacity for fluid flow through the inlet bore [28] existing pressures $P_1$ and $P_2$; and where [$F_{32}$ =] The capacity for fluid flow through the relief valve 32 at pressures [$P_2$ and $P_a$.]

3. The apparatus described in claim 2 characterized by the element in which the fluid is contained under pressure being a pressurized electrical cable.

4. The apparatus described in claim 1 characterized by the relief valve and its housing being a unitary assembly which is not part of any instrument to which fluid flows through the inlet and outlet ports of the relief valve housing, said housing having the inlet and outlet ports at different sides of the housing, a poppet valve that controls flow through the third port and that is movable between opened and closed positions, and resilient means urging the relief valve toward closed position.

5. The apparatus described in claim 4 characterized by the relief valve having a stem, means for guiding the valve toward and from a seat, and the resilient means being a spring that urges the relief valve toward closed position.

6. The apparatus described in claim 5 characterized by the relief valve having a head portion, the third port having a seat portion toward and from which the valve head moves, and having a bore of somewhat larger diameter than the valve head and providing a guide for the valve head with clearance for the escape of fluid around the valve head from the relief valve chamber.

7. The apparatus described in claim 6 characterized by packing between the valve head and the seat providing a surface against which the valve head contacts when in closed position to seal the relief valve closed.

8. The apparatus described in claim 5 characterized by the valve having a stem, a spring surrounding the stem, a shoulder on the valve stem, and a shoulder on the housing, the spring being compressed between the shoulders to bias the valve head toward closed position.

9. The apparatus described in claim 8 characterized by the shoulder on the stem being a nut threaded on the stem and adjustable lengthwise of the stem to change the pressure of the spring and thereby change the pressure at which the relief valve opens.

10. The apparatus described in claim 1 characterized by the housing having a connection for joining the housing to the passage from the element in which fluid is contained, and another connection for joining the housing with the passage leading to the detector, and said connections being constructed so that each requires a different complementary fitting on the passage whereby the housing cannot be connected backwards between said passages.

11. The apparatus described in claim 1 characterized by the element in which the fluid is contained being a cable with space therein that is filled with the fluid, and the detector being constructed for safe operation at pressures lower than the maximum pressure to which the fluid in the cable may be subjected.

12. The apparatus described in claim 11 characterized by the detector being a transducer that is operated by pressure from the cable and without requiring flow of fluid through the detector, and the relief valve being loaded to remain in closed position during normal operating conditions for the pressurized cable but with the loading light enough to cause the relief value to open before the pressure to the transducer rises to a value greater than that for which the transducer is intended to be used.

13. The apparatus described in claim 1 characterized by the inlet port having a cross-section which is only a small fraction of the cross-section of the passage leading from the element containing the fluid under pressure whereby fluid flowing to the chamber in the housing has a pressure drop through the inlet port many times greater than the pressure drop through the passage from the element containing the fluid under pressure, and the housing and its relief valve being much smaller than would be necessary to serve as a relief valve for the passage from said element on the upstream side of the inlet port of the housing.

* * * * *